(12) United States Patent
Checka (10) Patent No.: US 9,710,708 B1
(45) Date of Patent: Jul. 18, 2017

(54) METHOD AND APPARATUS FOR AUTONOMOUSLY RECOGNIZING AT LEAST ONE OBJECT IN AN IMAGE

(71) Applicant: Neal Checka, Waltham, MA (US)

(72) Inventor: Neal Checka, Waltham, MA (US)

(73) Assignee: VECNA TECHNOLOGIES, INC., Cambridge, MA (US)

(*) Notice: Subject to any disclaimer, the term of this patent is extended or adjusted under 35 U.S.C. 154(b) by 0 days.

(21) Appl. No.: 14/222,864

(22) Filed: Mar. 24, 2014

(51) Int. Cl.
*G06K 9/00* (2006.01)
*H04M 1/00* (2006.01)

(52) U.S. Cl.
CPC ............................ *G06K 9/00624* (2013.01)

(58) Field of Classification Search
USPC ........ 382/100, 103, 106–107, 118, 154–155, 382/159, 162, 168, 173, 181, 199, 203, 382/206, 209, 219, 232, 254, 274, 276, 382/286–291, 305, 321; 455/556.1; 340/568.1, 573.1; 348/152
See application file for complete search history.

(56) References Cited

U.S. PATENT DOCUMENTS

| | | | | |
|---|---|---|---|---|
| RE44,527 E | * | 10/2013 | Aviv | ............................. 348/152 |
| 8,873,813 B2 | * | 10/2014 | Tadayon | .................. G06K 9/00 382/118 |
| 2003/0058111 A1 | * | 3/2003 | Lee | .................... G06K 9/00342 340/573.1 |
| 2005/0002561 A1 | * | 1/2005 | Monachino | .......... G06K 9/6293 382/159 |
| 2009/0309728 A1 | * | 12/2009 | Yamamura | .......... G08B 13/1672 340/568.1 |
| 2011/0143811 A1 | * | 6/2011 | Rodriguez | ......... G06K 9/00986 455/556.1 |
| 2011/0244919 A1 | * | 10/2011 | Aller | .................. G06K 9/00973 455/556.1 |

* cited by examiner

*Primary Examiner* — Seyed Azarian
(74) *Attorney, Agent, or Firm* — Albert J. Brunett (57) ABSTRACT

A method and apparatus for autonomously recognizing at least one object in an image is provided. The method includes obtaining an image and providing an image analyzer for autonomously analyzing the image and autonomously identifying at least one item of information regarding at least one object in the image. The at least one item of information regarding the at least one object may be identified without regard to the at least one object's appearance, location, or orientation in the image and without requiring any outside intervention or human input, so that information regarding the at least one object, such as the at least one object's actions, movements, and locations may be obtained from the image.

3 Claims, 10 Drawing Sheets

METHOD AND APPARATUS FOR AUTONOMOUSLY RECOGNIZING AT LEAST ONE OBJECT IN AN IMAGE

BACKGROUND OF THE INVENTION

Field of the Invention

The present invention relates to a method and apparatus for obtaining information from at least one image and, more particularly, to a method and apparatus for obtaining information regarding at least one object from an image.

Background Information

Images such as video, photographs, or the like may be analyzed to obtain information regarding objects in the images for a variety of reasons. An existing technique for obtaining information from these types of images may include manually reviewing the images. This technique, however, may be labor-intensive, tedious, time-consuming, and inaccurate, among other drawbacks.

SUMMARY OF THE INVENTION

A method and apparatus for autonomously recognizing at least one object in an image is provided. The method includes obtaining an image and providing an image analyzer for autonomously analyzing the image and autonomously identifying at least one item of information regarding at least one object in the image. The at least one item of information regarding the at least one object may be identified without regard to the at least one object's appearance, location, or orientation in the image and without requiring any outside intervention or human input, so that information regarding the at least one object, such as the at least one object's actions, movements, and locations may be obtained from the image.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

The present invention is generally related to a method and apparatus for recognizing at least one object in an image. In the context of this invention, the term "image" may, depending on the particular embodiment and the types of information to be obtained, refer to a photograph, a series of photographs, a video, or the like (hereinafter "image")

These images may be analyzed to recognize and obtain information regarding objects shown in the image. For example, information regarding objects such as people, vehicles, tools, merchandise, equipment, weapons, packages, accessories, debris, or any other type of object may be obtained.

If the object is a person, information that may be obtained includes the person's location, their actions, their movements, their position, their interactions with the surrounding area, or the like. The ability to obtain this type of information in an unobtrusive and non-invasive way may be useful in a variety of applications.

In areas in which a person is performing a task, it may be beneficial to understand how they make use of their surrounding area. Knowledge of where they spend their time, how they are positioned, and what they are doing may help improve their ability to perform the task. For example, this knowledge may provide insight as to how to better design the area to maximize space, eliminate unnecessary distractions (e.g., looking out a window, checking a cell-phone), and to provide the maximum amount of comfort for the person who is performing the task.

Obtaining information about a person from an image may also be useful in law enforcement. For example, the apparatus may identify (e.g., via images from a security camera) whether a person or a group of people remain in a particular location such as a street corner for an extended period of time. Activity such as this may be indicative of gang-related activity and, if identified, an alert or signal to that effect may be communicated to law enforcement officials.

Or, assume a criminal suspect is being questioned by law enforcement officials. The apparatus may be able to identify whether the suspect is acting in ways that are indicative of non-truthfulness. For example, the apparatus may be configured to identify whether the suspect repeatedly looks to the ceiling or to the ground, or makes certain other gestures that are indicative of non-truthfulness.

Similarly, if an individual is providing a lecture or presentation, an image of the individual conducting a presentation may be analyzed to identify certain information regarding their performance. The apparatus may identify, for example, how many times the individual adjusted their posture, raised their arms, or other information related to their movement or other gestures to help improve their performance for future presentations.

The features of the invention may also be applied to sports. For example, information related to an athlete's movement, velocity, acceleration, accuracy, power, or other information related to the athlete's performance such as the trajectory of a ball or other item, or even information related to coaching signals may be identified. This type of information may be used for, among other things, scouting and evaluating athletes.

Analyzing people and their movements may also have advantages in retail, in which the apparatus may identify patterns of shoppers. For example, identifying where shoppers spend the most amount of time within a store may be helpful for advertising purposes and in determining optimal locations for item placement.

Obtaining information regarding the movements of people may also be helpful in evaluating employees. Information regarding the movement of people such as medical personnel, security guards, or other "floor employees" may be obtained to ensure they are doing their rounds and monitoring certain areas and for industrial engineering time study purposes.

Information regarding objects that a person is carrying may also be identified. For example, the apparatus may identify whether a person is carrying an object such as a weapon, or whether a person was carrying an object but placed it in an area and walked away.

In addition to identifying information regarding people, the apparatus may identify the presence or the movement of vehicles such as cars, trucks, vans, robots, military vehicles, aircraft, and maritime vessels. This information may be used in traffic pattern detection, security, law enforcement, military reconnaissance, or the like. The apparatus may also be configured to detect the presence of, for example, debris in bodies of water or on land to aid in search-and-rescue missions.

By applying innovative techniques, applicant has successfully been able to recognize objects in images and obtain certain information regarding the objects. These techniques can be applied to the applications briefly discussed above, as well as in human-computer interaction, in human factors engineering, in robotics, or in any other application in which information from an image is to be obtained.

Figure 1:
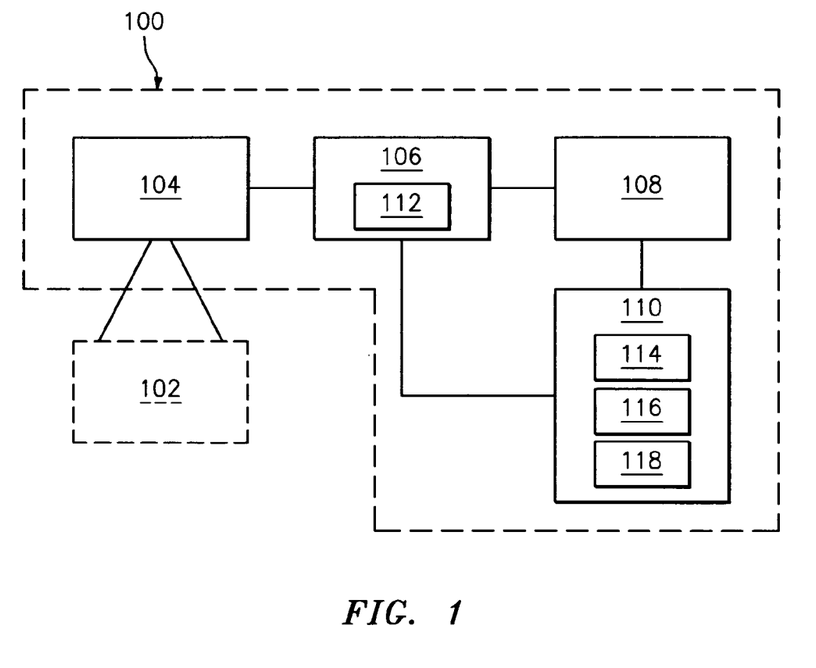
FIG. 1 generally illustrates a block diagram of the apparatus in accordance with one embodiment of the invention.

FIG. 1 generally illustrates a block diagram of the apparatus 100. The apparatus 100 may be used to obtain information from an image and may include an image capturing element 104, an image analyzer 106, a database 108, and a user interface 110. As stated previously, the apparatus 100 may be implemented in a number of applications.

Briefly, in operation, the image capturing element 104 may capture an image of an area 102. The captured image may be communicated to the image analyzer 106.

Based on information stored in the database 108, for example, the image analyzer 106 may autonomously obtain certain information about an object in the image. The obtained information may be stored in the database 108, outputted via the user interface 110, (e.g., to inform an operator about a certain identified object or a certain identified item of information regarding an object), or be used to perform some other activity.

The image capturing element 104 may be configured to capture an image regarding its surrounding area 102 and objects in the area 102. The image capturing element 104 may include a conventional camera element or the like that can capture an image in two dimensions or three dimensions (hereinafter "2D" or "3D," respectively). This image may include a photograph, a series of photographs, a video (dynamic and analyzed in real time or after being recorded), or the like, depending on the embodiment and the information to be obtained.

The image capturing element 104 may be configured separately from the apparatus 100, in which the image capturing element 104 and the image analyzer 106 may be operated by different parties. For example, a first party may operate the image capturing element 104 to capture an image, and communicate the image to a second party or location for analysis.

The image analyzer 106 may be in communication with at least the image capturing element 104, the database 108, and the user interface 110. After the image capturing element 104 obtains the image, or as the image capturing element 104 is obtaining the image, the image may be communicated to the image analyzer 106 (in which the image may be analyzed in real time).

The image analyzer 106 may be implemented using hardware or a combination of hardware and software. The image analyzer 106 may include a processing device 112, which may include one or more single-core and/or multi-core processors. The exact configuration of the image analyzer 106 may vary as long as it is capable of accomplishing the features of the invention. With the development of faster and more advanced processing devices 112, applicant contemplates the features of this invention may be used to more accurately analyze different types of objects in images and obtain more detailed information about the objects in the analyses.

The database 108 may be configured with or separate from the image analyzer 106. The database 108 may store information regarding sample images, instructions, and may include memory. The memory may include a volatile memory and/or a nonvolatile memory, and be configured to store instructions for execution by the image analyzer 106.

The database 108 may include, depending on the embodiment, synthetically generated images of objects in varying appearances, poses, orientations, or the like. The database 108 may also store other information regarding the objects such as their physical appearance or arrangement (e.g., if the object is a person, the relationships between body parts may be known and stored).

The user interface 110 may be configured to, among other things, allow an operator to "teach" the image analyzer 106 by defining which items of information should be identified in an image. The exact configuration of the user interface 110 may vary and may include a display 114, a keyboard 116, a mouse 118, and may be adapted to transmit and receive information in a visual, audible or tactile form.

One of the features of the invention is the ability to automatically and accurately estimate or otherwise obtain a 3D pose of an object (such as a human) from an image.

Figure 2:
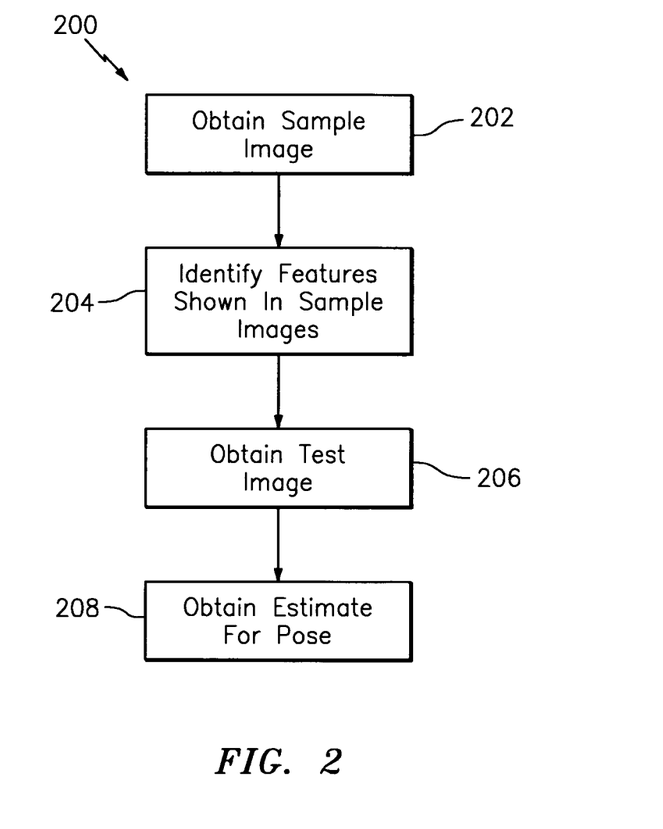
FIG. 2 generally illustrates a method of obtaining a 3D pose estimation in accordance with one embodiment of the invention.
Figure 3:
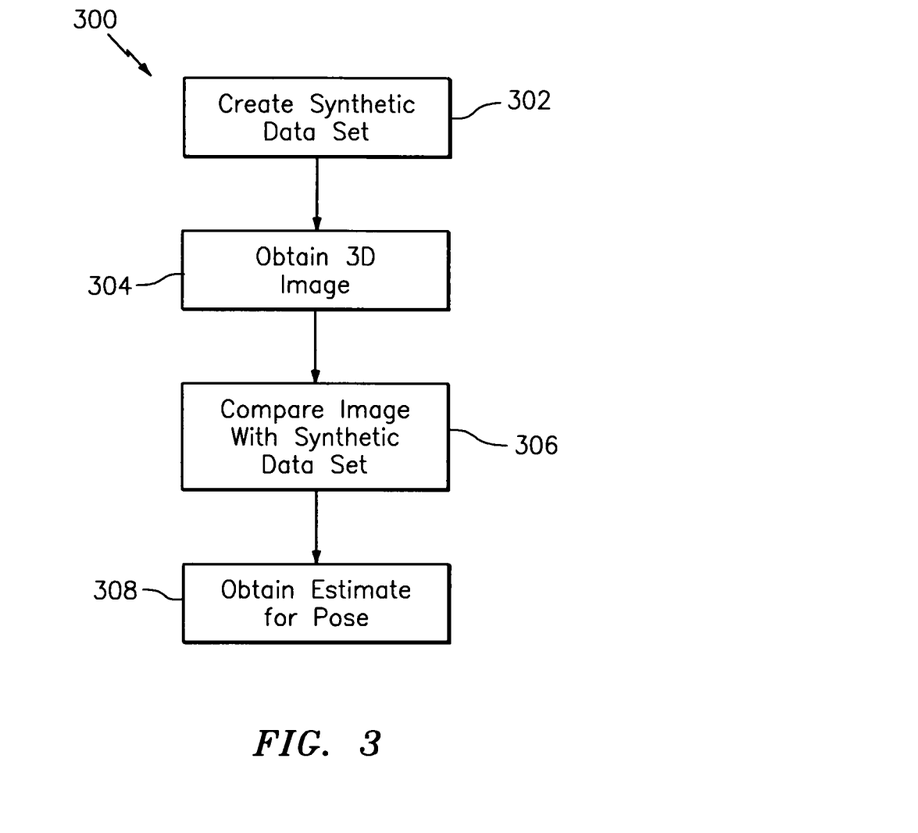
FIG. 3 generally illustrates a method of obtaining a 3D pose estimation in accordance with another embodiment of the invention.

FIGS. 2 and 3 generally illustrate methods of obtaining a 3D pose from a 2D image and from a 3D image, respectively.

FIG. 2 generally illustrates a method 200 of estimating an object's pose in 3D in accordance with one embodiment of the invention, in which an object's pose in 3D is estimated from a 2D image. In step 202, a sample image (a sample image or several sample images) of the object are obtained. This sample image may be captured by the image capturing element 104 as discussed previously.

In step 204, features of the object in the image may be extracted and identified by using any appropriate technique whether available now at the time of the invention or invented hereafter. Certain reoccurring features shown in the image may be identified and labeled with image patches, essentially creating a "skeleton-like" representation of the object. For each image sample, the spatial relationship between the image patches, is stored.

If the object is a person, specific body parts may be identified. An operator may, for example, label or otherwise identify which components of the skeleton-like representation or image patches correspond to the person's arms, legs, head, etc. This is essentially creating a library of information related to the general characteristics of a person.

In step 206, the image capturing element 104 may obtain a test image to be analyzed, and the test image may be communicated to the image analyzer 106. In step 208, the image analyzer 106 may analyze the test image to, based on knowledge from the sample image and the identified features, obtain an estimate of the object's pose in 3D.

If the object is a person, knowledge of the image patches (e.g., their locations with respect to each other) based on the sample image may be used to be identify or otherwise recognize certain body parts in the test image (e.g., head, torso, left arm, right arm, left leg, right leg, etc.). Accordingly, several different body parts can be identified and used to create a more accurate estimation of a person's pose in 3D.

This approach of using image patches may also be applied to recognize other objects in addition to people. For example, image patches corresponding to certain constituent parts of objects (e.g., parts of a vehicle), may also be used to recognize the object.

If the image includes is a single photograph, the object and its pose may be identified. If the image includes a video, certain actions or movements made by the object may also be identified.

FIG. 3 generally illustrates a method 300 of estimating an object's pose in 3D in accordance with another embodiment of the invention, in which an object's pose in 3D is estimated from a 3D image. In step 302, a synthetic data set of various 3D object shapes is created. This synthetic data set may include several sample object models with varying characteristics (appearance, orientation, shape, pose, etc.) that may be similar to an object's characteristics in a test image.

For example, if a person's pose is to be estimated, the synthetic data set may include several sample human models of varying poses, orientations, appearances, or the like, so that a match may be found regardless of the person's appearance, location, or orientation in the test image. Also, using a synthetic data set for comparison requires only a small amount of storage space.

In step 304, a 3D test image is obtained. The 3D test image may be in the form of 3D data like 3D laser scans, 3D camera images, volumetric data, motion capture data, or the like.

In step 306, the obtained 3D test image may be compared to the synthetic data set to find sample object models with similar characteristics to the obtained 3D test image. These comparisons may be performed by search techniques such as nearest neighbor search methods, or any other suitable technique available now or invented hereafter.

In step 308, an estimate of the pose is obtained based on comparisons with the synthetic data set. Based on the estimated pose of the person, anomalous shapes or other objects shown in the test image may also be detected. If the 3D models used for shape estimation correspond to "normal" conditions (i.e., in which the person is not carrying any weapons, backpacks, etc.) potential anomalous objects may be recognized as deviations from the synthetic model, and may also suggest that the person is performing a particular activity.

The image analyzer 106 may identify features of any recognized anomalous objects, such as their size, volume, location with respect the person, orientation with respect to the person, etc. These features may then be compared to sample data of potential objects of interest, such as weapons, to determine whether the object or the person presents a threat that may require further scrutiny. If a person is determined to be carrying a weapon, an alert or signal to that effect may be communicated to an operator such as a security guard, a law enforcement official, military personnel, or the like.

By obtaining an accurate estimate of an object's pose in 3D, an object can be continuously tracked, even with movement of the image capturing element 104 (i.e., varying viewpoints), object movement with respect to the image capturing element 104, and occlusion. Occlusion may occur when parts of an object are unable to be "seen" by the image capturing element 104, possibly due to self-occlusion or occlusion due to other items between the object and the image capturing element 104.

Figure 4A:
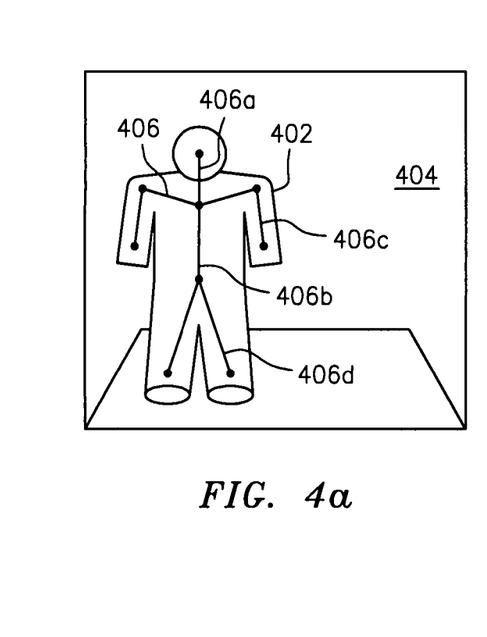
FIGS. 4*a-c* generally illustrate pose estimations of a person in accordance with one embodiment of the invention.
Figure 4B:
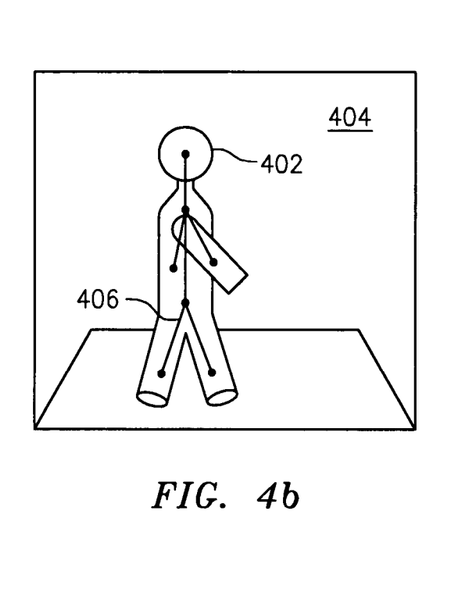
Figure 4C:
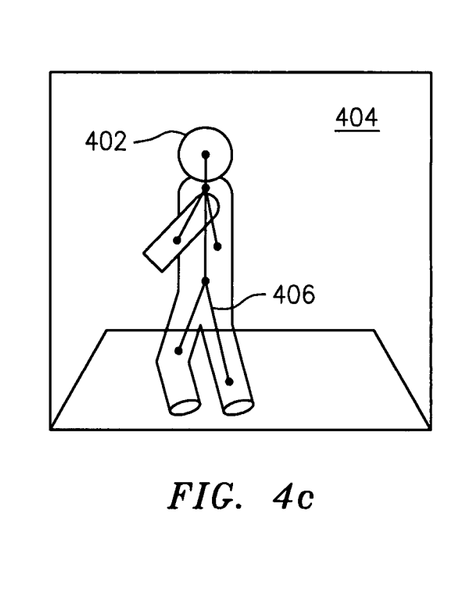

The ability to reason about this occlusion is illustrated in FIGS. 4a-c. FIGS. 4a-c show a person 402 walking within a monitored area 404. Also shown is a skeleton representation 406 of the person 402. The skeleton representation 406 includes components 406a corresponding to the head, 406b corresponding to the torso, 406c corresponding to the arms, and 406d corresponding to the legs.

FIGS. 4b and 4c generally show the person 402 facing towards the side of the area 404, essentially away from the image capturing element 104 (not shown). Accordingly, body parts may be occluded or otherwise blocked from view of the image capturing element 104.

Even with this occlusion, body pose—illustrated by the skeleton representation 406—may nonetheless be accurately estimated based on knowledge of the person's body parts with relationship to each other and bio-physical constraints of a person. This enables a continuous, more accurate estimation of a person's body pose (as well as their actions) regardless of their appearance, location, or orientation with respect to the image capturing element 104.

Another feature of the invention is the ability to "teach" the image analyzer 106 by defining which attributes, actions, times, locations, and trajectories, gestures, or the like, constitute items of information to be identified. This teaching aspect of the invention may be done via the user interface 110.

Figure 5A:
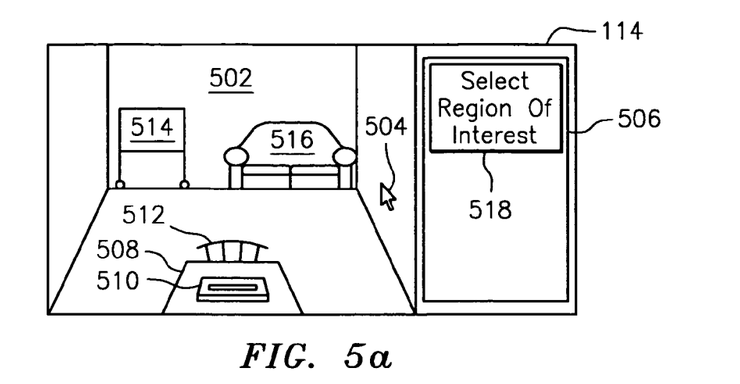
FIGS. 5*a-c* generally illustrate the apparatus being taught regarding items of information to be identified in accordance with one embodiment of the invention.
Figure 5B:
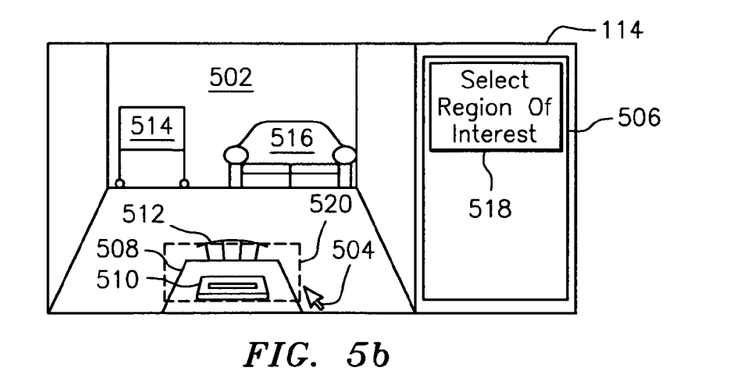
Figure 5C:
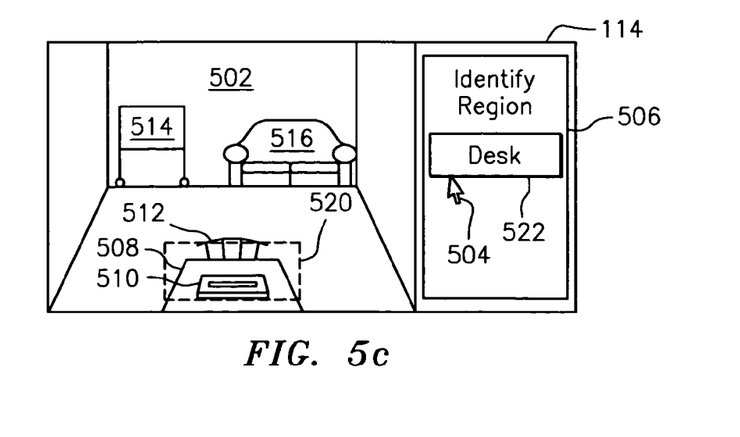

FIGS. 5a-c generally illustrate one embodiment of an operator teaching the image analyzer 106. FIGS. 5a-c generally illustrate a display 114 visually presenting an image 502 of an area such as a room or the like, and a cursor 504 for allowing an operator to interact with the image 502 and a teaching interface 506.

In this embodiment, the operator may be a medical, military, law enforcement, government, or security personnel, or anyone else who wants to obtain certain information about a person, such as their actions, movements, or locations. Or, the person whose actions are to be identified may also define which actions or other information he or she wants to be identified.

The image 502 may be captured by the image capturing element 104 as discussed previously. In this embodiment, the image 502 was captured before an image of a person is analyzed to identify certain information.

The image 502 may show items such as, for example, a desk 508 with a computer device 510, a chair 512, a drawing board 514, and a couch 516. These items are merely exemplary and the items shown within the image 502 will of course depend on the particular area.

The cursor 504 is illustrated as an arrow and may be controlled by the mouse 118 (not shown). However, other techniques for enabling the operator to interact with the image 502 and the teaching interface 506 may include touchscreen capabilities, vocal commands, or the like.

FIG. 5a generally illustrates a prompt 518 on the teaching interface 506, instructing the operator to identify a region of interest within the image 502. Regions of interest may be certain locations within the area that an operator wants know if and/or when a person is in, for example, by detecting dissimilarities in pixels between images or between portions of an image.

FIG. 5b generally illustrates an operator defining a first region of interest 520 by highlighting, with the cursor 504, a portion of the image 502 pertaining to, for example, the desk 508 and the computer device 510. This identification step is essentially defining, for the image analyzer 106, which types of information (such as a person's locations or actions) to identify.

In FIG. 5c, the operator may be presented with an input prompt 522 to label or otherwise identify the first region of interest 520. The operator may, for example, appropriately label this region as "DESK" via the keyboard 116 (not shown) or another input method.

After identifying the first region of interest 520, the operator may perform similar steps to identify other regions within the image 502 such as the drawing board 514 and the couch 516. The operator may similarly label these regions as "drawing board" and "couch," respectively. The order in which these regions are identified may of course differ.

Figure 6A:
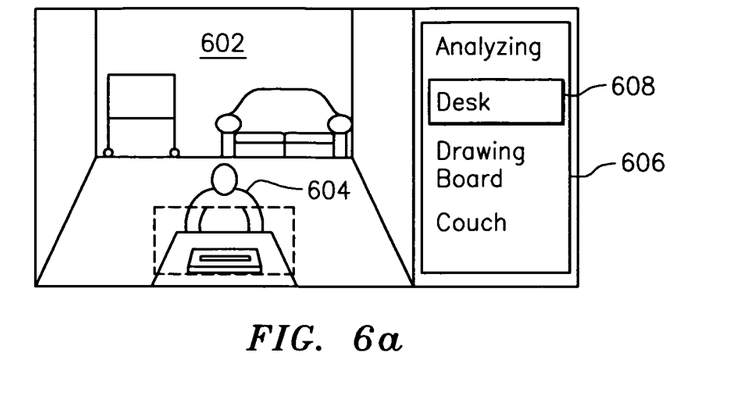
FIGS. 6*a-c* generally illustrate a person's actions being identified in accordance with one embodiment of the invention.
Figure 6B:
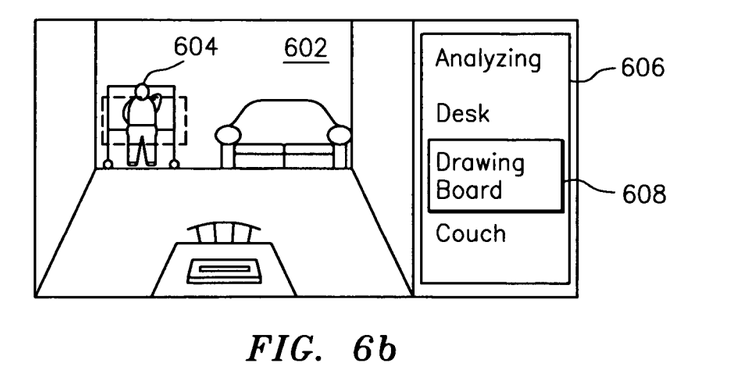
Figure 6C:
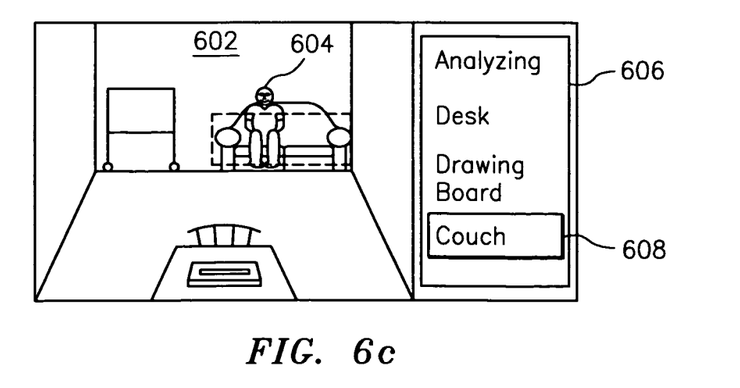

After regions of interest are identified, the image analyzer 106 may analyze a test image (video) to identify certain information. FIGS. 6a-c generally show this analysis being conducted on an image 602 of a person 604 in the area shown in the image 502 of FIGS. 5a-c. In this analysis, for example, the operator may want to determine, and the image analyzer 106 may autonomously identify, if and when the person 604 is in any of the regions of interest identified previously.

An analysis interface 606 may display the names of the regions of interest identified previously in FIGS. 5a-c. When the person 604 is in a region of interest, a designator 608 may highlight or otherwise indicate the corresponding region of interest on the analysis interface 606.

Accordingly, FIG. 6a shows the person 604 at the desk that was highlighted and labeled in FIG. 5c, with the designator 608 highlighting the "Desk" label on the analysis interface 606. FIGS. 6b and 6c similarly show the person 604 at the drawing board and at the couch, respectively.

This analysis may determine if and when the person 604 is at the desk, the drawing board, the couch, and may also suggest that the person 604 is performing a particular activity (e.g., typing on the computer device, writing on the drawing board, or resting on the couch). In other words, items of information regarding the person 604 may be identified to determine not only if and when they are at a particular location, but also if and when they are performing a particular activity.

The person's actions, movements, or locations may be identified and quantified in a variety of ways. For example, the image analyzer 106 may keep track of how many times the person 604 is in a specific region of interest or the amount of time the person 604 is in a specific region of interest (or performs a particular activity).

The image analyzer 106 may also keep track of specific patterns. The image analyzer 106 may, for example, keep track of which region of interest the person tended to go to after being at the drawing board 514, or the like. Similarly, the image analyzer 106 may identify how much time the person spends resting on the couch 516 in relation to how much time they spent at the desk 508 and/or drawing board 514.

Figure 7:
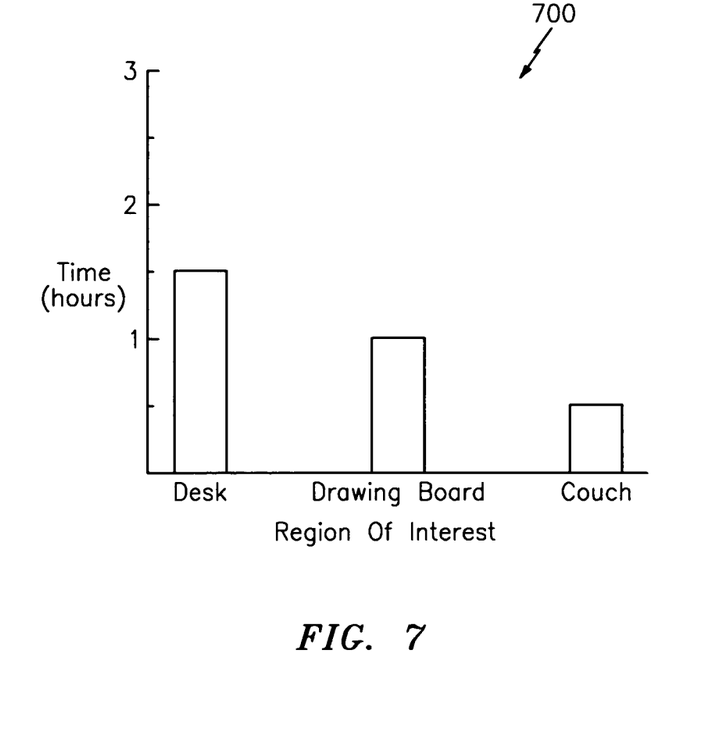
FIG. 7 generally illustrates a graph illustrating results of an analysis in accordance with one embodiment of the invention.

By autonomously conducting this analysis, operators may quickly and effectively learn about a person's actions, movements, or locations. To visualize the identified information, the results may be outputted and shown on the display 114 in the form of a graph 700 or the like, for example, as generally illustrated in FIG. 7. The graph 700 is exemplary and may illustrate the amount of time the person 604 spent at the identified regions of interest over a certain time span.

If an operator wants to review certain portions of the image (e.g., certain video footage), the image analyzer 106 may categorize and index certain portions. For example, the operator may select to only view portions of the image in which the person was at the drawing board. This provides a convenient and effective way to review a significant amount of an image (e.g., video) based on the specific interests of the operator.

As stated previously, the area in which actions are analyzed and the items or regions of interest within the area may of course differ. For example, a person's coffee mug and telephone may also be identified to determine how many times the person took a drink and made a telephone call/texted, respectively.

In FIGS. 5-6, the operator taught the image analyzer 106 about which information to identify before the image of the person was captured. In other embodiments, an operator may teach the image analyzer 106 about events that occur in an image after the image has been captured or as the image is being captured (i.e., the image used for teaching the image analyzer 106 may be the same image that is analyzed to identify certain information). For example, assume a thirty (30) second portion of a security camera image shows a person walking through a parking lot to their car, entering their car, and driving away.

An operator may teach the image analyzer 106 about these events by identifying the time span over which a certain event occurs. For example, the operator may temporally label the start and end of an event (e.g., the "person walking to car" event starts at five (5) seconds into the image, and ends eleven (11) seconds into the image). The operator may also identify and label the relevant objects of interest such as the person and the car so these objects can be tracked over this time span.

The image analyzer 106 may extract geometric features of the person's movement (trajectory), such as walking to their car, and store the information in the database for later comparison. In future analyses, the image analyzer 106 may, based on information stored in the database 108, identify similar events such as a person walking to their car.

The image analyzer 106 may also note interactions between the tracked objects. For example, if a tracked person moved towards a car and then "disappeared" this may be indicative of an event "person getting into vehicle."

Although previous discussions have largely been directed towards identifying information regarding an individual person, information regarding more than one person may also be obtained simultaneously. For example, there may be more than one person within an area such as the one shown in FIGS. 5a-c at a given time, and certain information regarding each person may be analyzed. A graph such as the graph 700 in FIG. 7 may also be made for each person.

In addition to analyzing when a person is at or in a particular region of interest, certain gestures made by a person may also be identified. Similar to detecting when a person is at or in a particular region of interest as discussed previously, pre-defined gestures may be identified and quantified (e.g., the number of times a person raised their arm or made certain other gestures).

Recognizing these types of gestures may also have uses in the field of robotics. If the apparatus 100 of FIG. 1 is used in conjunction with a robot, the robot may be configured to interpret certain gestures as commands or visual cues. For example, FIG. 8 generally shows a person 802 making a "stop" gesture to a robot 804, essentially instructing the robot 804 to stop moving or otherwise remain in place, while a "wave" or "come here" gesture made by the person may instruct the robot to travel to the person.

Figure 8:
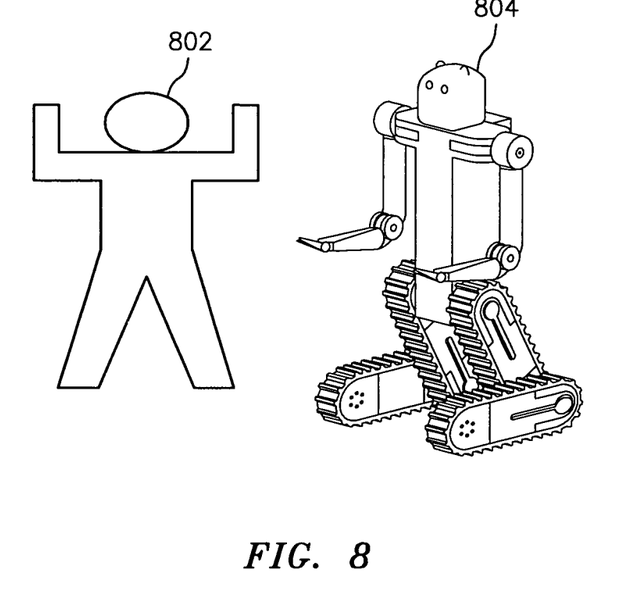
FIG. 8 generally illustrates a person providing a gesture-based command to a robot in accordance with one embodiment of the invention.

In an embodiment utilizing several robots 804 that may be moving through an area, information identified by one robot may be communicated to other robots. For example, if a first robot approaches an unfamiliar object, information regarding the unfamiliar object may be identified by the first robot and stored in a database 108 (e.g., in a cloud-based database). By accessing the database 108, other robots may obtain information regarding the object and recognize the object if and when they approach the object in the future.

Figure 9:
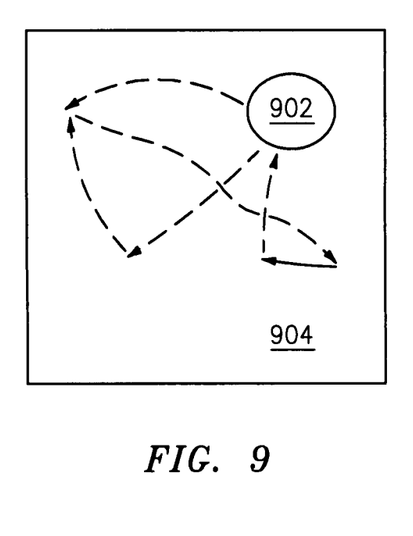
FIG. 9 generally illustrates a person's movement within an area in accordance with one embodiment of the invention.

Regarding an object's overall movement, FIG. 9 generally illustrates an overhead view of a person 902 (illustrated as a circle) and their movement within an area 904. In addition to analyzing a person's specific activities or gestures, the image analyzer 106 may track or otherwise identify information regarding the movement of the person 902 within the area 904.

Figure 10:
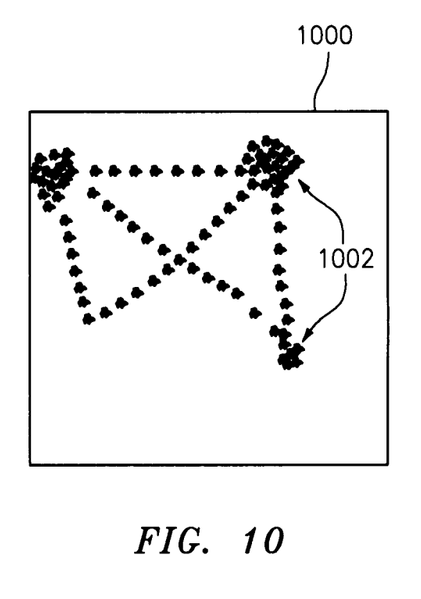
FIG. 10 generally illustrates a movement heat map showing a person's movement within an area in accordance with one embodiment of the invention.

FIG. 10 generally illustrates the movement of the person 902 of FIG. 9 in the form of a movement "heat map" 1000. The movement heat map 1000 of FIG. 10 may generally show where the person 902 spent their time, with "clusters" 1002 indicating regions in which the person 902 spent a significant amount of time.

Tracking an object's movement through an area may have uses in security, law enforcement, and military applications. For example, a person or a vehicle, as well as their movement through an area such as a parking lot, may be identified. When identified, an alert or signal to that effect may be communicated to an operator (for example, if an individual or vehicle had entered into a restricted zone).

This allows operators to more appropriately allot their time or otherwise divert their attention to where it is most needed. For example, in a room in which a security official is monitoring several image feeds on display screens, an alert or signal may be communicated to the security official instructing him or her to pay attention to a particular image feed, or a particular image feed may automatically be shown on all display screens if further scrutiny may be required.

A person's gestures, activities, and movement within an area may all be monitored in the same analysis. In other words, in a single analysis the image analyzer 106 may analyze an image to identify a person's location within the area, certain gestures made by the person, and certain activities performed by the person.

While FIGS. 5-10 are generally related to obtaining information from an image regarding an individual object, applicant contemplates that the features of this invention may be used to obtain information regarding several objects (including people) and in areas such as public places, residential areas, industrial areas, and commercial areas, or the like. For example, and as mentioned previously, information regarding shoppers at stores, shopping malls, or the like, can be obtained to identify certain items of information regarding shopper behavior.

Figure 11:
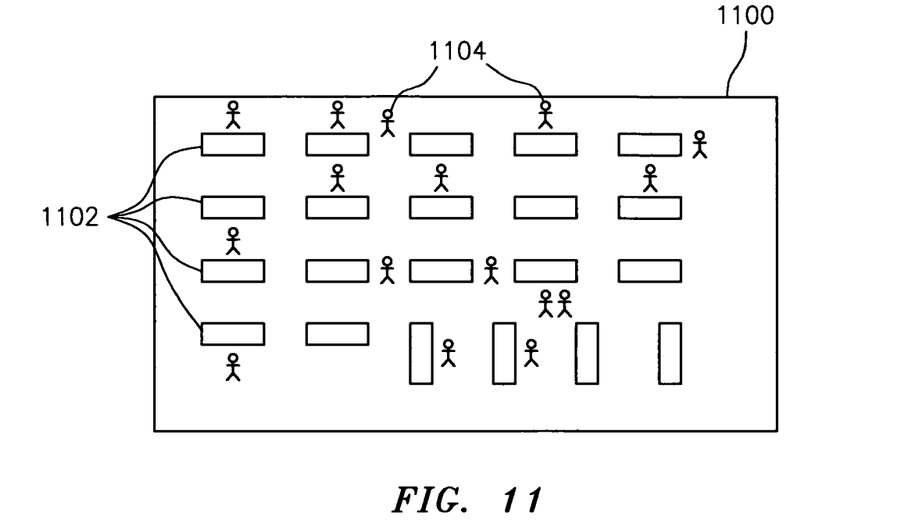
FIG. 11 generally illustrates an overhead view of a store in accordance with one embodiment of the invention.

FIG. 11 generally illustrates the features of the invention being used in a shopping center such as a retail store or the like. FIG. 11 generally illustrates an overhead view of a store 1100 (e.g., via a security camera). Also shown in FIG. 11 are several tables, shelves (hereinafter "tables" 1102), which may be used for advertising and displaying items, and several shoppers 1104 at various locations within the store 1100.

The shoppers 1104 within the store 1100 may be identified from this overhead view and observed for an extended period of time (e.g., a span of several minutes, hours, or throughout the course of an entire day or longer). Information such as the amount of time a given shopper spends at a particular location, such as in front of a particular table, may be identified in substantially the same ways as discussed previously.

Figure 12:
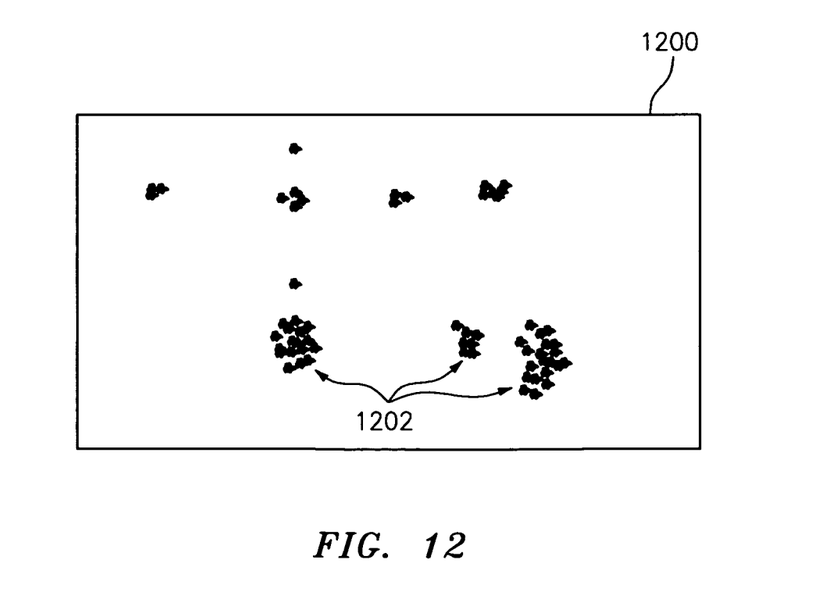
FIG. 12 generally illustrates a shopper traffic heat map displaying shopper patterns in accordance with one embodiment of the invention.

FIG. 12 generally illustrates a shopper traffic heat map 1200 that essentially shows which store regions 1202 experienced the highest amount of "shopper traffic." The term "shopper traffic" may refer to value determined by a number of criteria, such as the number of shoppers 1104 who were at specific table for longer than some minimum amount of time, the average amount of time all shoppers 1104 spent at a table, or the like.

This type of information may be useful in determining, among other things, the most optimal locations for item placement. Similarly, retail establishments may present this information to item producers and marketers who may be willing to pay a premium to have their items placed or advertised at locations that tend to experience the most amount of shopper traffic.

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A robot apparatus for autonomously determining activities with regard to an object in a video image, comprising:

an image capturing element for capturing a video image, the video image including one or more activities being undertaken by the object;

a video display that provides the video image captured by the image capturing element for viewing by an operator;

a user interface that is readily accessible by the operator at least portions of which are visually displayed on at least a portion of the video display as the captured video is running and being observed by the operator, the user interface providing the operator with the ability to create a library of video snippets contained within the robot apparatus for future comparison to a synthetic dataset of the video image being captured by the image capturing element, each snippet representing at least one motion being undertaken by the object of interest, the user interface enabling the operator to tag selected portions of the video to create and label the desired snippet at least for future counting and categorization; and an image analyzer at least including hardware and software that autonomously analyzes the video image and autonomously identifies other future portions of the video image and other video images that are substantially similar to at least one video snippet from the library of previously created video snippets contained within the robot apparatus and tracks the number of times each snippet occurs in the video images.

2. The apparatus as defined in claim 1, wherein the image analyzer analyzes the video image in real time.

3. The apparatus as defined in claim 1, wherein the video display is a touch screen style display and the user interface provides accessibility via the operator touching the screen.

* * * * *